May 11, 1937. F. J. LAPOINTE 2,079,692
BROACH SHANK CONNECTER
Filed Oct. 16, 1933
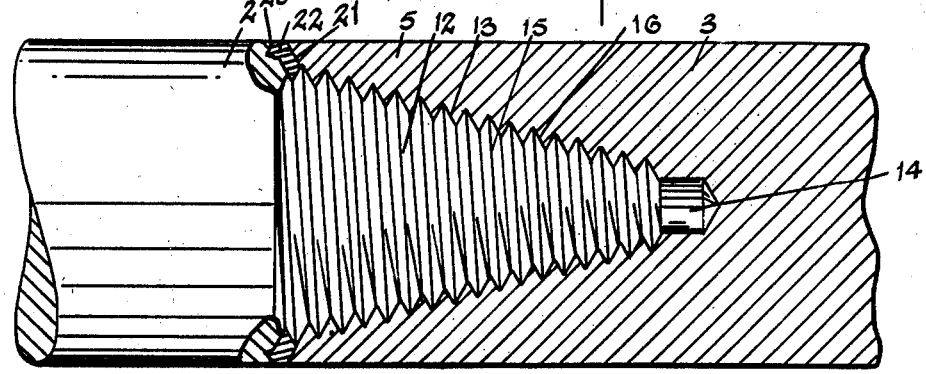
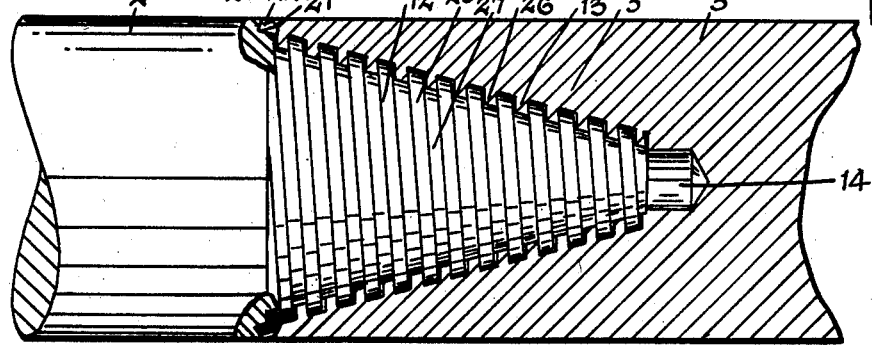
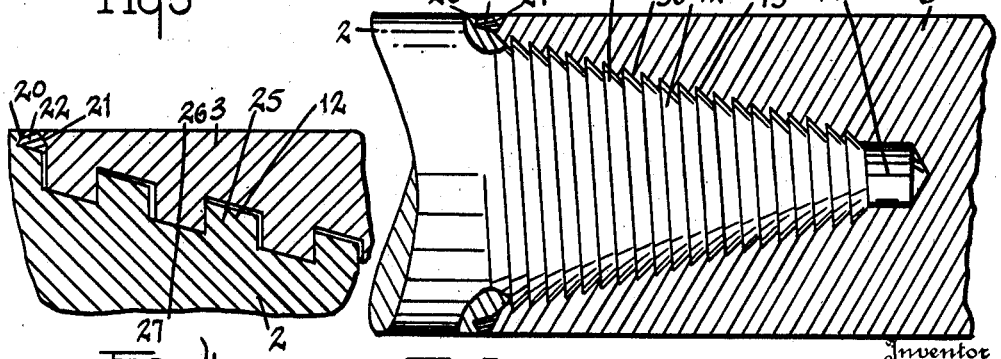
Inventor
Francis J. Lapointe
By Faust F. Crampton
Attorney Patented May 11, 1937

2,079,692

UNITED STATES PATENT OFFICE 2,079,692

BROACH SHANK CONNECTER

Francis J. Lapointe, Ann Arbor, Mich.

Application October 16, 1933, Serial No. 693,728

3 Claims. (Cl. 287—125)

My invention has for its object to provide an efficient broach having a shank part and a toothed part, the shank and the toothed parts having end portions so formed that the said parts may be readily interconnected and will have a stress resistance greatly in excess of the weaker portions of the toothed part of the broach. This is of particular value in connection with broaches where the shank parts of the broaches are required to be of considerable length commonly due to the length required for connection to the draw head of the broach machine, thickness of bed plate, and length of the hole or slot to be broached. The invention is adapted for use in connection with either pull broaches or push broaches, and, as is well known in connection with broaches, the toothed part must necessarily be formed of an exceedingly high grade of steel because of the fact that the teeth are necessarily formed not only to have cutting clearance but also to produce a chip clearance which necessitates cutting into the body of the broach and reducing its cross-sectional area in advance of each tooth. Also the material of which the broach is formed must be of a character that the teeth, particularly the end edges, may have a hardness and a sharpness that will withstand not only the cutting operation of metal but also the impacts produced by the change in movement of the broaching machine due to the change in the cutting resistance of the broach, as the number of teeth actually cutting reduce and increase intermittently by one as they consecutively leave and enter the metal being broached. The impacts that are thus caused are often referred to as "bumping" and predominate where the thickness of the metal being cut is no greater than the length of four or five teeth of the broach, that is, where the metal does not spread more than four or five teeth of the broach. Where the metal spreads less than four or five teeth, the bumping is greatly accentuated and becomes less as the number of teeth spread by the metal increases.

As is well known, broaches are formed to cut metal of all thicknesses and of many different kinds and non-uniform metal that varies in hardness. These operating conditions necessitate the formation of broaches from an exceedingly high grade and high priced metal.

The shanks of the broaches are merely force-transmitting parts and consequently may be formed of a much cheaper metal, and their resistance may be increased by a single tempering operation. The metal of the broach commonly is ten or twenty times as much in price as the metal of the shank and where the shank is of necessity of considerable length, there is a great saving of cost by the use of my invention, particularly in view of the fact that the shank part may be connected with any one of a number of toothed parts of broaches.

As is well known in connection with broaches, they greatly vary in shape. They are made to conform to the shape of the holes—hexagonal, cylindrical, square, oblong or elliptical in shape, or shaped for cutting slots of different dimensions and relations of surfaces, which necessitates stocking a great variety of broaches in ordinary machine shops that produce even limited kinds of work. Thus, by my invention, there is produced a great reduction in total cost of the broaches by the use of a much cheaper grade of steel in forming shanks that may be used interchangeably with quite a large number of broaches.

Heretofore, replaceable broach shanks have been attempted with the unfavorable result that the broach has been weakened at the point of connection between the shank part and the tooth part of the broach. As is well known, the shanks of pull broaches have cross dimensions less than that of the smaller teeth of the broaches, and the shanks of push broaches have cross dimensions that are smaller than the cross dimensions of the larger teeth, and consequently where broaches are formed of two parts, the interconnecting means necessarily must be within these dimensional limitations. Heretofore, where thread connection is made between the parts, there has always been a lack of stock in one or both of the parts, or there has been a marked reduction of the cross-sectional area in a transverse direction which, as is well known, greatly weakens the metal and produces a broach weakness at the point of connection that is less than that that exists at the reduced portion of the broach located in advance of the smaller of the teeth of the broach. By my invention, I have provided means for producing a connecting structure within the dimensional limitations that greatly exceeds the stress resistance of the cutting part of the broach, that is, that portion that affords chip clearance in advance of the smaller teeth of the broach.

My invention may be contained in broaches of different forms, and the structural details may be varied without departure from the spirit of my invention. To illustrate a practical application, I have selected three forms of broach structures that contain my invention and shall describe them hereinafter. The structures are illustrated in the accompanying drawing.

Fig. 1 illustrates the side view of the broach having a removable shank. Figs. 2, 3, 4, and 5 illustrate three different modifications of the interconnecting structure used for interconnecting the shank and tooth parts of a broach of the type illustrated in Fig. 1. Fig. 2 illustrates these parts interconnected by a V thread. Fig. 3 illustrates an interconnecting structure having threads that correspond somewhat to square threads, the surfaces of the tops and the valleys, however, being made to taper in conformance to the shapes of the interconnecting portions of the parts of the broach. Fig. 4 is an enlarged cross-sectional view of a part of the structure illustrated in Fig. 3. Fig. 5 is a further modification of the connecting part of the broach and illustrates a threaded structure wherein one side of the thread conforms to a helical surface generated by a line extending at right angles to the axis of the broach and rotated about and moved along the axis of the broach, the said surfaces being located on the sides of the thread that are nearer to the body of that part of the broach in which they are formed.

For purposes of illustration and description of my invention, I have selected a pull broach such as is shown in Fig. 1 as an example of a practical embodiment of my invention. The pull broach 1, shown in Fig. 1 has a toothed part 2 and a shank part 3 that are interconnected by the characteristic structural formation of their end portions 4 and 5. When the parts are connected, they conform to the dimensions that are common to such broaches, which, as is well-known, vary dimensionally, according to the results to be accomplished when used in broaching machines.

The shank portion is provided with any suitable means for connecting the broach in a broaching machine. In the particular form shown, the shank is provided with a recess portion 7 that forms a neck and a head 8 that provides a means for connecting the broach in a draw head. The cutting part 2 is provided with usual teeth 9, each tooth having the usual tooth clearance 10 and the usual chip clearance in advance of each tooth. Aside from tooth breakage or nicking, the weakest part of the broach is at that point where there is the maximum reduction of cross-sectional area to produce chip clearance, which is usually in advance of the first tooth that engages the work and consequently any interconnecting means between the shank part and the tooth part of the broach must of necessity have a cross-sectional resistance plus a reasonable safety factor that exceeds such weaker parts of the broach. By my invention, the end portions, 4 and 5 of the parts of the broach are so formed that by actual test the full resistance and strength of the interconnecting parts of the broach exceed the weaker portions of the cutting part of the broach by something over 40 per cent, making the broach practically immune against breakage or separation between the parts in the ordinary use for which ordinary broaches having the same dimensions are designed.

The end portions 4 and 5 of the parts of the broach are formed conical, one to have a male cone surface and the other to have a female cone surface to produce cones of the same taper, and to have male thread in one and female thread in the other that will interfit and increase rapidly in tightness of interengagement as the parts are rotated one relative to the other. The taper of the cone surface, as measured with reference to the axes of the cones, is necessarily limited between substantially ten and substantially forty degrees, since tapers less than substantially ten degrees produce a slope that eliminates the saving in cost, unless a destructible or breakable shoulder is produced at the base of the male cone, while, on the other hand, a taper greater than substantially forty degrees results in the formation of a breakable thread by reason of the fact that the excess slope produces a thin walled or a sharply wedge-shaped thread that reduces the tensile strength of the interconnecting parts below that of the weaker part of the toothed part of the broach.

In the formation of the parts of the broach either of the parts may be formed to have the male cone. This part is cut to produce the desired conical taper and then may be machined to form the thread by progressing the cutting edge of the thread forming tool towards and along the axis of the said part in the manner well known in machine operations. In forming the end portions of the other part, a clearance hole is bored to a depth greater than that to which the other end of the thread will extend when completed. The female cone surface is then formed by the usual machine process and the interior thread is cut, the diameter of the cutting tool progressing along the axis of the part and the cutting edge of the tool receding towards the axis of the part. The bore 14, affords opportunity for the completion of the thread at the inner and smaller end of the cone surface.

In the form of construction illustrated in Fig. 2, the thread is formed V-shaped, the edge of the thread cutting tool being maintained so that the side parts of the V-edge are inclined at the same angle from a plane extending at right angles to the axis of the part, that is, the ordinary V-shaped thread is formed in the conical surface of the end portions of the parts of the broach.

The parts 2 and 3 at the bases of their respective cones are shaped to form, in conjunction with a metal ring or washer, an elastic interlock, first to produce a high frictional resistance to rotation in a direction to disconnect the parts and second, to maintain high contact pressure between the opposing surfaces that sustain and transmit the force that overcomes the cutting resistance and the bumping shocks that occur in the cutting operation as the broach is moved along the metal to be shaped. In the form of construction shown, part 2 has the male cone 12, and a shoulder formed at the base of the cone is cut back to form the V-shaped slot 20 while the end of the portion 5 is provided with a conical surface having a sharp concave taper located at the base of the conical surface 13, as at 21, that opposes the surface of the V-shaped slot 20 formed in the part 2. A ring or a washer that may be in the form of a split ring is located at the bases of the conical surfaces and when the parts 2 and 3 are located in position and threaded together, the ring or washer 22 is squeezed by the surface 21 into the recess 20. Preferably the ring 22 is formed of soft metal such as lead or copper or alloys of metals that produce substantially the same reactive effect when subjected to the pressure exerted when the parts 2 and 3 are interconnected and subjected to a relatively high rotative force. Ordinarily the metal of the ring squeezes out of the space between the surfaces 20 and 21, and the metal forced out is cut down to the cylindrical surface of the parts 2 and 3 to prevent snubbing or catching in the work and in handling the tool. The ring provides an elastic counter pressure that operates with sufficient pressure to withstand the impacts due to jarring and elasticity of the parts of the machine and the broach as the cutting resistance is met and overcome in the movement of the broach through the work.

After the cone surfaces 12 and 13 are formed, in producing the structure illustrated in Fig. 3, the valleys are cut to form a helical surface that may be described as one generated by lines extending at right angles to the axes of the parts when the lines are progressively moved along the axes and rotated about the axes to produce the threads 25 and 26. They are formed to have slight clearance in that the threads 25 and 26 are each so formed as to have a width slightly less than the valleys and a height that is slightly less than the depth of the valleys. By these dimensional relations and by reason of the fact that one cone is a male cone and the other is a female cone, there is afforded a structure that enables exact shaping and fitting of not only the contacting opposed side surfaces of the thread through which the pulling force is transmitted when the parts are interconnected, but also enables exact finishing of the top surface of the thread 26 and the surface 27 that forms the bottom surface of the valley. The female cone surface 13, after the thread is cut, may be ground and accurately cone-shaped and also the connecting portion of the part 2 being a male cone, the bottoms of the valley may be accurately finished to conform to the ground cone surface 13, and hence there will be produced an exceedingly rigid construction in that the lateral surfaces of the thread which contact with each other are located substantially at right angles to the direction in which the force is transmitted from the shank part to the cutting part of the broach, and there is provided accurately finished true coned surfaces. Thus, the total area through which the force is transmitted is substantially at right angles to the direction of its application and is equal to the area of the lateral surface of the entire thread length, which is many times greater than the cross-sectional area of the broach at the clearance space located just in advance of the smaller teeth of the broach. Also, since the conical contacting surfaces at the top of the female thread and the bottom of the male thread, as well as the lateral faces of the threads may be accurately machined, the parts, upon being forced together by the conically surfaced thread, produces a structure that may be readily formed so that its parts are absolutely, mechanically speaking, in alignment. Also since the bottom of the male and the top of the female threads are tapered, rotation of the part causes wedging of the tapered surfaces to force with a great pressure the lateral surfaces of the threads through which the pulling force is transmitted against each other. It forces the end portions of the shank and cutting parts of the broach into a substantially perfect fit and forms a structure unitary in character or effect, that will resist loosening and injury from whipping due to sudden changes in pressure exerted through the broach, as well as preventing all injury due to vibration transmitted from the machine, or the work, along the broach.

The parts 2 and 3 in the form of construction shown in Fig. 3 may be shaped at the bases of the conical surfaces to receive the ring 22 that may be secured in position and will operate in the manner described in the description of the construction shown in Fig. 2.

In the form of construction illustrated in Fig. 5, the threads 30 and 31 are formed V-shaped in cross-section, the angle of the V in the valley of the thread, however, being so disposed as to locate the side of each thread nearer to the body part on which it is formed in a surface that may be described as one generated by a line extending at right angles to the axis of the part on which the thread is formed, and progressively moved along and rotated about the axis. This produces a thinner thread, that is, one having a sharper angle than the ordinary V-thread and consequently cannot be efficiently applied to cones having tapers greater than thirty five degrees. It, however, produces in connection with a V thread, a surface that is substantially at right angles to the direction in which the pulling force is transmitted, and at the same time produces a structure that may be easily formed.

The parts are provided with the ring 22 that is secured by means of a structural shape of the parts at the bases of the conically shaped portions formed at the ends of the parts, as described in connection with the forms of construction shown in Figs. 2 and 3.

I claim:

1. A joint for tools and the like and comprising a shank part and a tool part, each part having a conically formed end portion interfitting the conical end portion of the other part, the said portions having interfitting threads, each thread having helical surfaces extending substantially at right angles to the axis of the parts in which the thread is formed and along the axis of the joined parts and conforming directionally to the conical shapes of the end portions and located on the same side of the thread as the body of the said part, the part having the male cone shaped portions having a shoulder and an annular recess formed in the said shoulder, the other of the said parts having a concave conical surface located in opposed relation to the surfaces of the recess, a metal washer disposed between the said surfaces of the recess and the said concave conical surface and clamped by the conical surface into the recess and the said helical surfaces against each other by rotation of one threaded part relative to the other threaded part.

2. A joint having a shank part and a tool part, each part having a conically formed end portion interfitting the conical end portion of the other part, the said portions having interfitting threads, the opposite sides of each of the threads having helical surfaces extending substantially at right angles to the axis of the tool and about and along the axis of the tool and conforming directionally to the cone shaped portions, the valley of the thread of the female conical portion having a greater depth than the valley of the male conical portion.

3. A joint having a shank part and a work forming part, each part having a conically formed end portion interfitting the conical end portion of the other part, the said portions having interfitting threads, the threads having helical interfitting surfaces located on the same side of each thread on which the body part on which the thread is formed is located and extending substantially at right angles to the axis of the cone portion on which it is formed and about and along the axis of the cone portion and conforming to the cone shaped portions, the top of the thread of the female conical portion having a ground female cone surface, and the bottom of the valley formed between the turns of the threads of the male conical portion having a male cone surface, the said cone surfaces accurately interfitting, the height of the threads of the male cone portion being less than the depth of the valley between the parts of the thread of the female cone portion and forming a clearance between the top of the thread of the male portion and the bottom of the valley between the turns of the thread of the female portion to insure inter-cone wedging of the conical surfaces of the tops of the thread of the female cone portion when the parts are connected together.

FRANCIS J. LAPOINTE.